United States Patent
Le et al.

(10) Patent No.: US 7,031,736 B2
(45) Date of Patent: Apr. 18, 2006

(54) METHOD AND APPARATUS OF HEADER COMPRESSION FOR BROADCAST SERVICES IN RADIO TELECOMMUNICATION SYSTEM

(75) Inventors: Khiem Le, Coppell, TX (US); Liangchi Hsu, San Diego, CA (US); Mark W. Cheng, San Diego, CA (US); Nguyenphu Thinh, Southlake, TX (US)

(73) Assignee: Nokia Corporation, Espoo (FI)

( * ) Notice: Subject to any disclaimer, the term of this patent is extended or adjusted under 35 U.S.C. 154(b) by 226 days.

(21) Appl. No.: 10/308,534

(22) Filed: Dec. 3, 2002

(65) Prior Publication Data

US 2003/0130000 A1    Jul. 10, 2003

Related U.S. Application Data

(60) Provisional application No. 60/336,916, filed on Dec. 3, 2001.

(51) Int. Cl.
*H04B 15/00* (2006.01)

(52) U.S. Cl. ............... 455/502; 455/503; 455/517; 455/515; 455/507; 455/509; 455/414.1; 455/414.4; 370/350; 370/503; 375/272; 375/354

(58) Field of Classification Search .......... 455/517, 455/518, 502, 72, 439, 501, 90.1, 507, 503, 455/515, 509, 414.1, 414.4; 370/331, 350, 370/503; 709/205; 375/272, 354
See application file for complete search history.

(56) References Cited

U.S. PATENT DOCUMENTS

| | | | |
|---|---|---|---|
| 6,032,197 A * | 2/2000 | Birdwell et al. ............ | 709/247 |
| 2002/0021681 A1 * | 2/2002 | Madour ...................... | 370/331 |
| 2002/0089947 A1 * | 7/2002 | Holtzman et al. .......... | 370/328 |
| 2002/0097701 A1 * | 7/2002 | Lupien et al. .............. | 370/338 |
| 2002/0142730 A1 * | 10/2002 | Hsu ............................ | 455/72 |
| 2002/0176382 A1 * | 11/2002 | Madour et al. ............. | 370/331 |
| 2002/0196743 A1 * | 12/2002 | Thalanany et al .......... | 370/252 |
| 2003/0002449 A1 * | 1/2003 | Rittle et al. ................ | 370/277 |
| 2003/0073453 A1 * | 4/2003 | Basilier ...................... | 455/503 |
| 2003/0086378 A1 * | 5/2003 | Chen et al. ................. | 370/252 |
| 2003/0172114 A1 * | 9/2003 | Leung ........................ | 709/205 |

\* cited by examiner

*Primary Examiner*—Lester G. Kincaid
*Assistant Examiner*—Khai Nguyen
(74) *Attorney, Agent, or Firm*—Alston & Bird LLP (57) ABSTRACT

A method and apparatus for packet-data header decompression, particularly advantageous for use in connection with broadcast and multicast messages being transported through a radio telecommunication system operable according to the CDMA 2000 standard. When a mobile subscriber desires broadcast content from a content server, the mobile station sets up a PPP session for submitting the request and negotiating security protocols. When a subscription is granted, the mobile station receives broadcast content that has undergone header compression. In order to synchronize its decompressor, the mobile station receives a full header from a PDSN. The full header is preferably sent out on a periodic basis just for this purpose. The frequency of full-header transmissions by the PDSN is increased from a normal mode to a high full-header frequency (HFHF) mode upon receiving a request for a full header from a mobile station, but returns to normal-mode full-header transition frequency after receiving an ACK message from the requesting mobile indicating successful decompressor synchronization, or upon the expiration of a predetermined HFHF-mode maximum duration.

19 Claims, 6 Drawing Sheets

METHOD AND APPARATUS OF HEADER COMPRESSION FOR BROADCAST SERVICES IN RADIO TELECOMMUNICATION SYSTEM

RELATED APPLICATION

This patent application claims benefit of U.S. Provisional Patent Application No. 60/336,916 filed Dec. 3, 2001.

TECHNICAL FIELD OF THE INVENTION

The present invention relates generally to the transmission of information through a radio telecommunication network, and more specifically to a method and apparatus for the synchronization of broadcast-information header decompressors that more efficiently uses air-interface resources in radio telecommunication systems such as those operable according to the CDMA 2000 standard.

BACKGROUND OF THE INVENTION

Radio communication has been in use for many years. Radio communication takes advantage of the phenomenon that radio waves, that is, energy from a certain range of the electromagnetic energy spectrum, may travel for a relatively great distance. In addition, radio waves may be generated and processed in such a way as to encode them with information. In practical terms, this means that when information-bearing waves are transmitted, a suitable device (often referred to as a "radio"), properly tuned, may intercept and decode them—gleaning in the process the transmitted information.

Information encoded and transmitted in radio wave may be used for many purposes. In effect, the information is simply a set of instructions to the receiver, which it will execute to produce a desired result. This result may be simply the reproduction of a sound, or involve something more elaborate such as piction, motion picture, or other visual display. It may even include a computer program for execution by the receiver. And of course it may include a combination of these effects. Naturally, for the intended effect to obtain, the receiver must be capable of receiving and processing the radio-signal borne instructions appropriately.

Radio communication was first put to use for two-way voice communication, but was soon adapted for broadcast use. Broadcast simply means that the program content (that is, the desired effect or presentation) is transmitted, usually on a relatively-powerful radio-wave signal, with the intent that it will be received by a large number of receivers. By using different frequencies (or frequency bands), numerous broadcasters can send their programs simultaneously. To take advantage of this multichannel programming, receivers (such as radios and televisions) are selectively "tuned" to receive, process and display only one broadcast transmission at a time. "Multicasting" is similar to broadcasting, but uses techniques such as encryption and coding to ensure that only a selected group of all the otherwise capable receivers will actually be able to receive and process the signals. The advantage of multicasting or broadcasting, obviously, is that a particular program needs only to be transmitted once in order to reach many subscribers. (Note that for convenience herein, the term "broadcast" will include "multicast", unless in a particular instance its exclusion is manifest.)

More recently, radio telephony has gained in popularity, due in large part to technological advancements that both make it economically feasible for a large population, and also permit its widespread use even in crowded urban areas. Telephone communication, of course, began with a wire-line network that connected a number of telephone-service subscribers. To eliminate the need to connect each subscriber to every other one, switching offices were introduced. In a switching office, connections are made to enable the temporary creation of a complete electrical circuit between one caller and another. Each subscriber is connected to a local switching office by a set of wires, and can be connected to the local switching office of another through a series of connections that are set up temporarily for a particular cell. The switches, wires, and cables used to establish these circuits are captured only for the duration of the call, and are afterwards released for use by others.

Radio telephony must operate somewhat differently. While the network may be largely made of (automated) call-routing switches that are connected to each other by wire, communication between each individual telephone and the network are accomplished using radio communications. As should be apparent, however, there may be a great number of radio telecommunication subscribers operating in a given area, and using ordinary two-way radio communication they would soon interfere so frequently with each other's transmissions that the system would become unusable. The concept of cellular telephony and various frequency sharing techniques are used to avoid this condition.

As has been mentioned, calls by radio-telephone subscribers are routed through a network. The telephones, commonly referred to as mobile stations (MSs) because they can be used from any location within the network coverage area, communicate with a nearby base station (BS), which is in turn connected to the network. The network is divided into numerous "cells", each having one or more base stations for communication with mobile stations located there.

Figure 1:
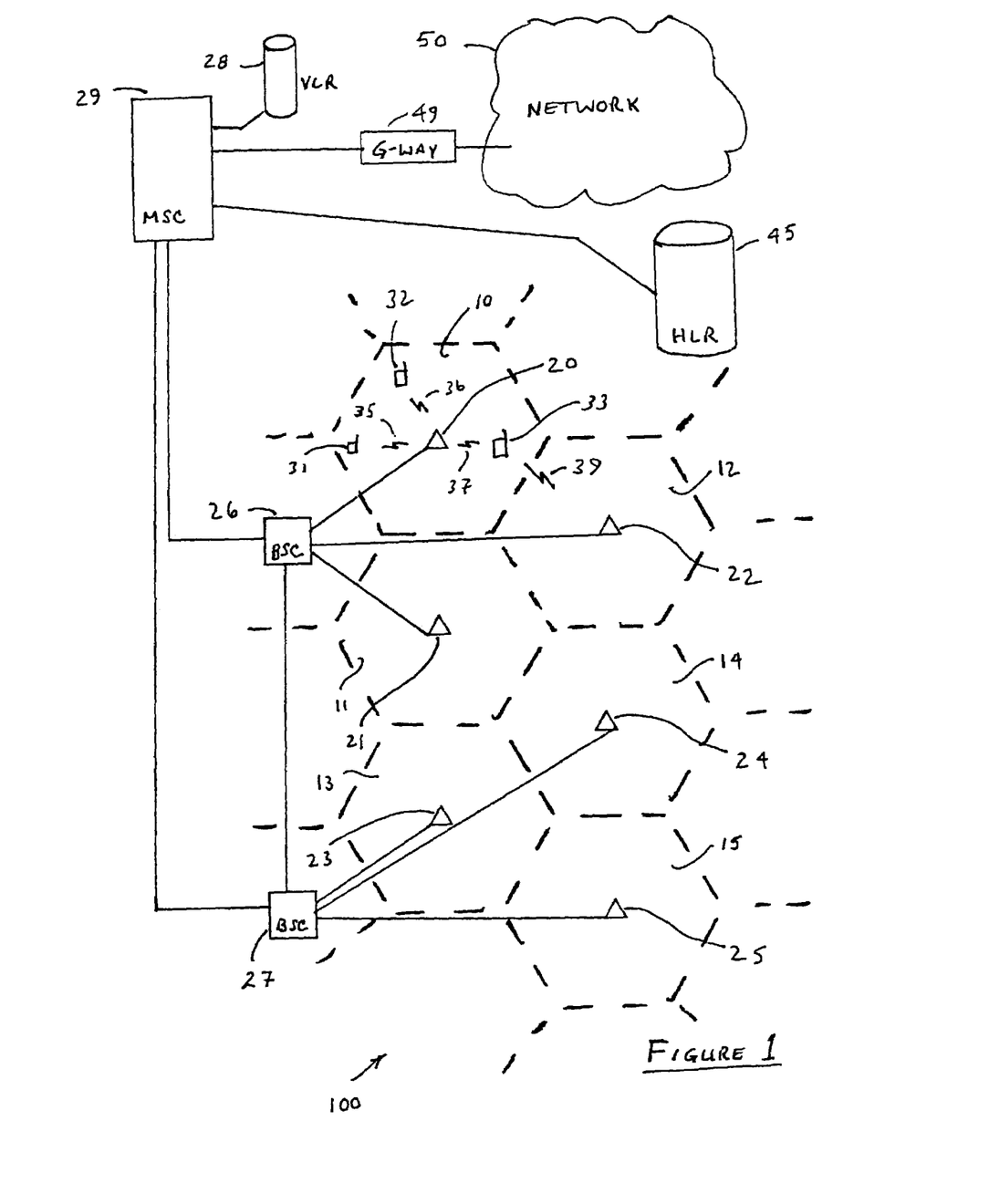
FIG. 1 is a simplified block diagram illustrating the configuration of a typical public land mobile network (PLMN)

For example, FIG. 1 is a simplified block diagram illustrating the configuration of a typical PLMN 100. As mentioned previously, the entire geographic area covered by PLMN 100 (which is not entirely shown in FIG. 1) is divided into a number of cells, such as cells 10 through 15 delineated by broken lines in FIG. 1. Although only six cells are shown, there are typically a great many. In the illustrated embodiment, each cell has associated with it a base transceiver station (BTS) for example BTS 20 for transmitting and receiving messages to and from mobile stations (MS) in cell 10, here MS 31, MS 32, and MS 33, via radio frequency (RF) links 35, 36, and 37, respectively. Mobile stations MS 31 through MS 33 are usually (though not necessarily) mobile, and free to move in and out of cell 10. Radio links 35–37 are therefore established only where necessary for communication. When the need for a particular radio link no longer exists, the associated radio channels are freed for use in other communications. (Certain channels, however, are dedicated for beacon transmissions and are therefore in continuous use.) BTS 21 through BTS 25, located in cell 11 through cell 15, respectively, are similarly equipped to establish radio contact with mobile stations in the cells they cover.

BTS 20, BTS 21, and BTS 22 operate under the direction of a base station controller (BSC) 26, which also manages communication with the remainder of PLMN 100. Similarly, BTS 23, BTS 24, and BTS 25 are controlled by BSC 27. In the PLMN 100 of FIG. 1, BSC 26 and 27 are directly connected and may therefore both communicate and switch calls directly with each other. Not all BSCs in PLMN 100 are so connected, however, and must therefore communicate through a central switch. To this end, BSC 20 is in communication with mobile switching center MSC 29. MSC 29 is operable to route communication traffic throughout PLMN 100 by sending it to other BSCs with which it is in communication, or to another MSC (not shown) of PLMN 100.

Where appropriate, MSC 29 may also have the capability to route traffic to other networks, such as a packet-data network 50. Packet-data network 50 may be the Internet, an intranet, a local area network (LAN), or any of numerous other communication networks that transfer data via a packet-switching protocol. Data passing from one network to another will typically though not necessarily pass through some type of gateway 49, which not only provides a connection, but converts the data from one format to another, as appropriate. Note that packet-data network 50 is typically connected to the MSC 29, as shown here, for low-data-rate applications. Where higher data rates are needed, such as in 3G CDMA networks (explained below), the packet-data network 50 may be connected to PLMN 100 differently (see for example FIG. 2).

There are distinct advantages to the cellular architecture. Because any given mobile station always communicates only with nearby base stations, lower transmission power may be used. In addition, the frequency bands used to define separate channels for use by each active subscriber in one cell may also be used in another relatively-nearby (though not neighboring) cell without concern for interference. Note that a particular frequency channel (or channels) is defined for use by an active subscriber, and when the call is done it may be released for use by another subscriber in the same cell. Mobile stations, which can communicate on many different frequencies within a designated range, are not permanently assigned a single frequency. Mobile stations are, of course, mobile, and various strategies have been developed to assign and un-assign channels for communicating with a particular base station as the mobile station moves in and out of its coverage area (preferably without call interruption).

In addition, frequency-sharing schemes have been developed so that a number of subscribers may share a frequency even if they are located in the same cell. In other words, a single frequency band may define a number of channels. One frequency-sharing scheme takes advantage of the fact that typical voice communications do not require constant transmission to be effective, and so divides a given frequency into numerous channels using time slots. A time slot is a short, recurring span of time that is assigned to each channel, and information on that channel is transmitted only within the assigned slot. This technique is referred to as time-division multiple access (TDMA). In TDMA, the time slot allocation of each frequency is made such that subscribers in a telephone conversation perceive no discontinuity.

Another multiple-access (frequency-sharing) scheme is referred to as code-division multiple access (CDMA). In CDMA, separate channels are formed by processing information signals for transmission using one of a defined set of codes. Communication between a base station and a mobile station coordinate which code or codes will apply to a particular call involving the mobile station. The codes are mutually orthogonal, so transmissions processed with them do not normally interfere with each other.

In order to make sure the various components of a network work properly together, various standard protocols are promulgated. Current CDMA equipment, for example, operates according to either the IS-95, or the more recent CDMA 2000 standard. (New equipment may work according to both, backward-compatibility being a desirable feature). The CDMA 2000 (also known as IS-2000) standard was developed in part, to accommodate the efficient transmission over the cellular air interface of non-voice content, such as data and streaming multimedia presentations.

This non-voice content presents its own transmission concerns; data, for example, although it can be sent in short, discontinuous bursts, must be virtually free from error (whereas a voice conversation can be understandable despite a relatively high number of transmission errors). Multimedia must not only be continuous and presented in proper order, it must be relatively error-free as well. Equipment that can effectively handle all of these types of transmissions is sometimes referred to as third-generation (3G) equipment; CDMA 2000 is a 3G standard.

As should be apparent, 3G communications require high transmission capacity and place a greater demand on network resources. In some transmission media, such as optical fiber, this poses little concern. In cellular radio, however, widespread use and the medium's physical limitations mean that radio channels may be severely taxed, and other techniques are needed to ensure they are efficiently utilized. One such technique is called compression.

Compression is a widely-used technique for the efficient storage and transmission of data. There are actually many such techniques used for a variety of techniques used for a variety of applications, and each has their own advantages and disadvantages. In general, however, these techniques rely on the ability of a compressor to represent a frequently-occurring block of data in an abbreviated form that will be understood by a decompressor, which reconverts the abbreviation to its original form. Naturally, the compressor is associated with a transmitting device and the decompressor with a receiving devices. Many devices, of course, both transmit and receive and accordingly also include both a compressor and a decompressor.

Data is frequently transmitted in packets. A packet is a discrete block of data that is part of a larger data set that has been broken up for efficient transmission. Packets may vary in size, according to the system through which they will travel, but their size is generally determined by the particular transmission protocol rather than by the specific content being transmitted. (Although different types of content may invoke the use of different protocols.) Data traveling in packets may be compressed, at least to some extent.

Packet data must be addressed. Packet-data systems, for example the Internet, do not establish a single "circuit" for transmission. Rather, each packet is routed to its destination through whatever route is most easily available. The individual packets related to a particular block of information may therefore take different routes to their destination, where they will have to be reassembled in their original order to make sense. The receiver is informed what to expect and if any packets are lost in transmission, a retransmission request is generated. As should be apparent, each packet must have associated information identifying it and its destination. Packets therefore have in addition to their information content, or payload section, a "header" containing overhead information so that they may be properly routed and later reassembled in the correct order.

Naturally, the headers are added for transmission and discarded when they are no longer needed. Packet headers, however, must still be transmitted and received—and therefore consume network resources just as does the payload information itself. Header compression techniques are therefore applied in an attempt to conserve those resources—especially when the packet information is transmitted over the air interface. This is particularly important when broadcasting multimedia content, which in the CDMA 2000 context is typically sent according to the realtime transport protocol (RTP). In RTP, for example, if header compression is used on packets carrying encrypted broadcast content, the Internet Protocol (IP) header may be compressed, as may the security parameter index (SPI) field of the encryption security payload (ESP) header. When this compression is used, the overhead due to transport and encryption of the broadcast content is reduced by approximately thirty percent.

Before a mobile station can decompress received packet headers, however, the context of its decompressor needs to be synchronized with the transmitting node's compressor. For this to occur, the full (uncompressed) header needs to be transmitted (and received), often more than once. And to prevent delay and minimize tuning time, the full header must be transmitted as soon as possible. Not being compressed, however, the full header uses up valuable (radio) broadcast channel resources. In the broadcast scenario, moreover, the same content is typically being transmitted to a large number of receiving stations, each of which must be individually synchronized. Sending the full header frequently enough to ensure that they are all maintained in this condition detracts from the network's ability to take advantage of header compression techniques. Needed then, is a way for allowing many mobile stations to easily synchronize their packet-header decompressors without overtaxing the air interface. The present invention provides just such a solution.

SUMMARY OF THE INVENTION

The present invention is directed to an apparatus and method for header decompression, for use in a broadcast (or multicast) scenario in a system operating according to CDMA 2000 or a similar standard. In one aspect, the present invention is a method of maintaining synchronization that includes the steps of establishing a point-to-point (PPP) session between a subscribing mobile station and the packet-data serving node (PDSN) through which the broadcast content will be received and retransmitted in packet data form. The mobile station uses this session to subscribe to the broadcast, and to request a full header for synchronization. When the full header is received, the mobile station uses it to synchronize its decompressor, whereupon the mobile station sends an acknowledgment (ACK) message to the PDSN, which then resumes broadcasting the full header at a lower frequency. The method may further include the step of detecting an out-of-sync condition, followed by establishing an additional PPP session, sending a request for a full header, and upon successful synchronization, sending an ACK message so that the system may return to normal mode. (Of course, more than one full header may be required to achieve synchronization.)

In another aspect, the present invention is a system for permitting the efficient synchronization of decompressors for use in decompressing broadcast-content headers. The system includes a PDSN to receive the broadcast content from a transmitting content server, and to retransmit the broadcast content to mobile-station subscribers via a base stations covering the areas in which the mobile stations is located. The PDSN is operable to establish a PPP session with the mobile station in order to not only set up the broadcast-subscription service, but to receive and respond to full-header requests by transmitting the full header to the mobile station, or increasing the frequency of full-header transmissions until an acknowledgment is received, indicating that the requesting mobile station has successfully synchronized and no longer requires the full header.

In yet another embodiment, the present invention is a mobile station operable to establish a PPP session with a PDSN for setting up a subscription to a broadcast service operating ever a packet data network. The mobile station of the present invention is further operable to use the PPP session to request transmission of a full header associated with the broadcast content, to receive a full header sent by the PDSN through the base station, and to use the full header to synchronize its decompressor so as to be able to accurately process broadcast packet data having compressed headers. In addition, the mobile station is operable to send an acknowledgment to the PDSN indicating that it has successfully synchronized and frequent full-header transmissions are no longer needed. The mobile station may also be operable to detect an out-of-sync condition occurring during the reception of broadcast content and to set up an addition PPP session in order to request a full header for resynchronization.

BRIEF DESCRIPTION OF THE DRAWINGS

For a more complete understanding of the present invention, and the advantages thereof, reference is made to the following drawings in the detailed description below.

DETAILED DESCRIPTION

FIGS. 2 through 6, discussed below, and the various embodiments used to describe the present invention are by way of illustration only, and should not be construed to limit the scope of the invention. Those skilled in the art will understand that the invention is not restricted only to telecommunications systems operating according to the CDMA 2000 (IS-2000) standard, but rather that principles of the present invention are equally applicable to other, similar systems, particularly those having a unidirectional channel and a bi-directional channel, in addition to the devices, systems, and applications specifically discussed herein.

Figure 2:
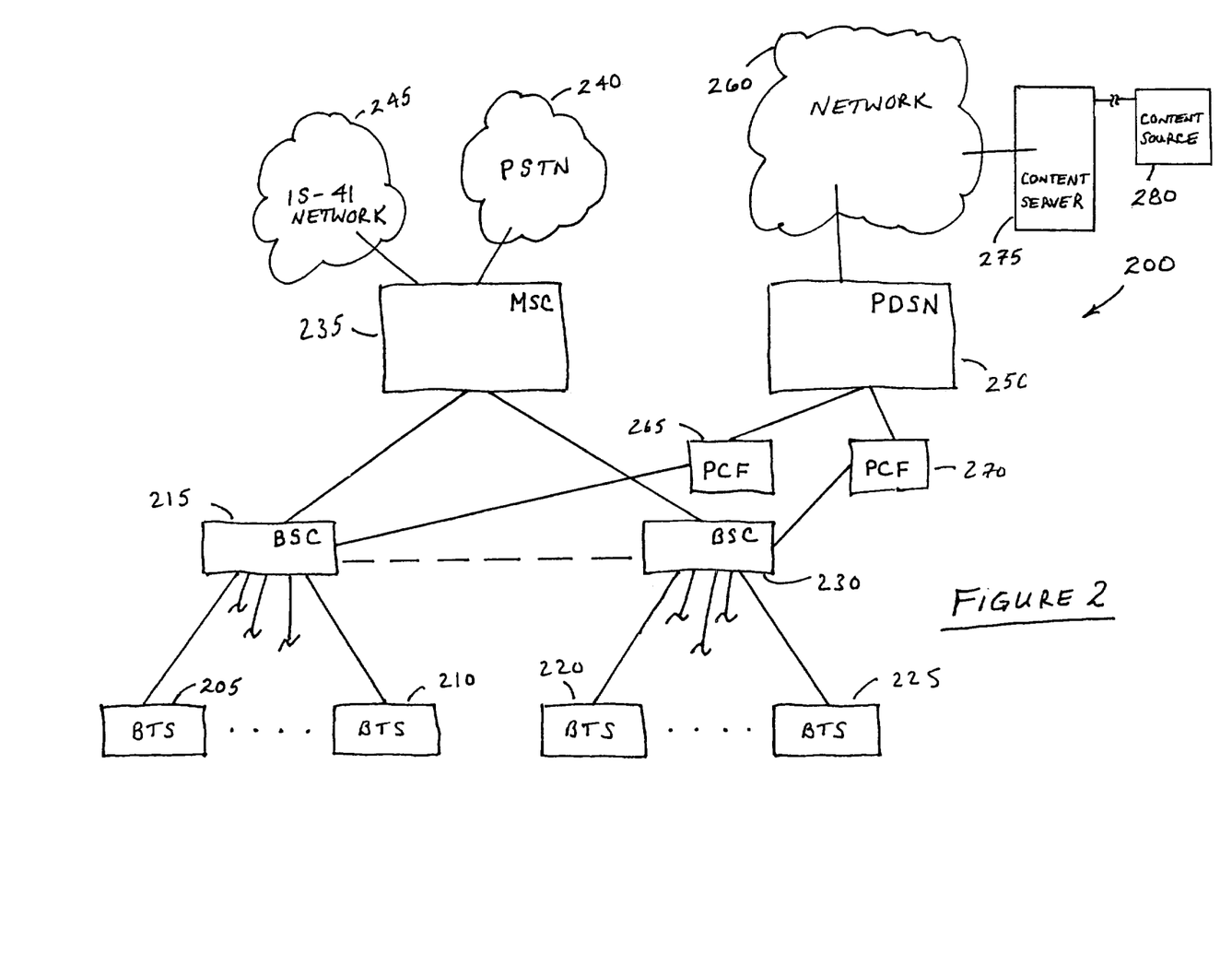
FIG. 2 is a simplified block diagram illustrating selected components of an IP-data compatible wireless PLMN that may be used for the transmission of broadcast media in accordance with an embodiment of the present invention.

FIG. 2 is a simplified block diagram illustrating selected components of an IP-data compatible wireless public land mobile network (PLMN) 200 that may be used for the transmission of broadcast media in accordance with an embodiment of the present invention. This PLMN is similar though not identical to the system of FIG. 1. Note also that FIG. 2 is drawn schematically and does not reflect the relative geographic locations of the illustrated components.

Again, each BTS is controlled by a BSC, which is typically though not necessarily associated with a plurality of BTSs. In FIG. 2, this relationship is shown by BTS 205 and BTS 210 connected with BSC 215, and BTS 220 and 225 connected to BSC 230. BSC 215 and BSC 230 may also be in communication with each other, as shown by the broken line connecting them. The terminated lines emanating from BSC 215 and BSC 230, as well as the ellipses between the BTSs, indicates that there may be more than two, and in fact many, BTSs operated by and through a BSC. Voice communications are forwarded to the MSC 235, from which they can be switched to another BSC or to the public switched telephone network (PSTN) 240, as appropriate. MSC 235 is also in communication with Interim Standard-41 (IS-41) network 245. IS-41 is a standard for sending control messages and enabling roaming in a CDMA wireless network. Voice traffic is sent through the MSC except that which is directed to a mobile station in a geographic area covered by the BSC, and except traffic that can be switched between BSCs that are in direct communication with each other.

In the network of FIG. 2, data communications are not sent through MSC 235, but instead are handled by a packet data serving node (PDSN) 250. The PDSN 250 connects base station with a packet-data network, typically the Internet. IP packet data from a mobile station that are received at the BSC are passed through a packet control function (PCF), and relayed to the PDSN 150 for transmission through a packet-data IP network 260 (such as the Internet). In the embodiment of FIG. 2 data traffic received in BSC 215 is passed through PCF 265, and data traffic to and from BSC 230 through PCF 270. Data traffic from the IP network 260 is likewise routed to PDSN 250, and from there are sent to the appropriate BSC through a PCF. Data is transferred between PDSN's over an IP network.

In the embodiment of FIG. 2, the broadcast or multicast content originates at content source 280 and is prepared for delivery through the IP network 260 at content server 275. Note that although only a single content source and server are shown, in realty, there may be many broadcast stations. Note also that while content will ordinarily originate at a "source", for practical purposes it may be pre-produced and simply transferred in some fashion to the server 275 for broadcast.

Figure 3:
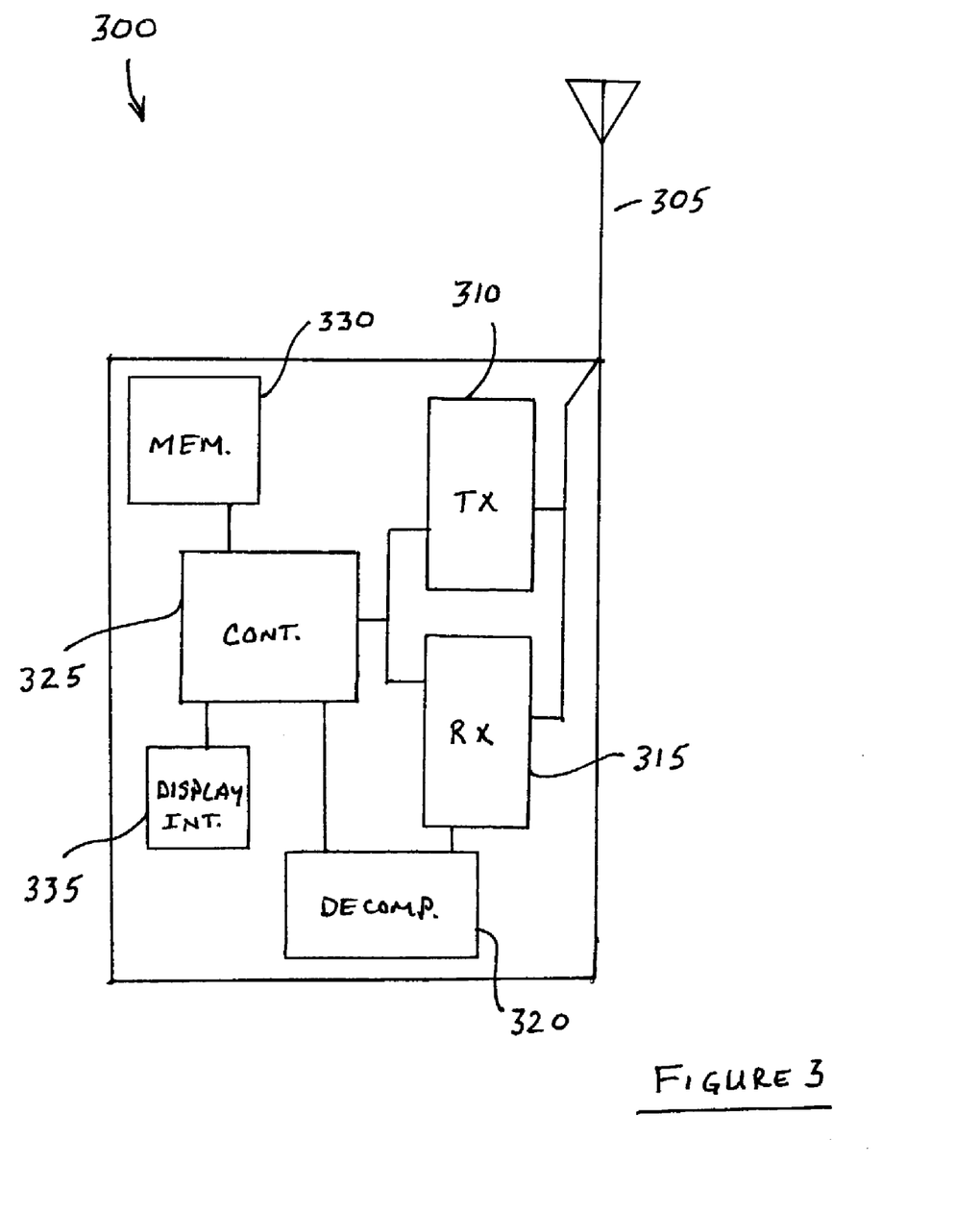
FIG. 3 is a simplified block diagram functionally illustrating the basic internal components of a mobile station configured for operation according to an embodiment of the present invention.

FIG. 3 is a simplified block diagram functionally illustrating the basic internal components of mobile station 300 configured for operation according to an embodiment of the present invention. Note that while many mobile stations are cell phones, others may be personal digital assistants (PDAs), mobile gaming devices, or similar instruments that encompass a combination of these functions. Mobile station 300 communicates with a nearby base station over the air interface 301 using an antenna 305. Transmit circuitry 310 and receive circuitry 315 are connected to antenna 305 for the performance of their respective functions. Coupled to the receive circuitry 315 is a decompressor 320 for decompressing compressed transmissions. In accordance with the present invention, the decompressor 320 synchronizes its context for header decompression with the context of the compressor using a full header received during a PPP session, as explained more fully below. The decompressor 320, transmit circuitry 310, and receive circuitry 315 work under the control of controller 325, and are coupled to a memory storage module 330 where information necessary to the decompression process (and other related and unrelated processes) may be stored. Also coupled to the controller 325 are one or more display interfaces 335 for directing display components (not shown) such as an LCD screen, speaker, or vibration generator, so the received and processed broadcast content may be presented to the subscriber.

As mentioned above, in order to make more efficient use of limited air-interface resources, header compression techniques are applied to significantly reduce the size of the packet-data header. For the decompressor 320 to properly perform its function with respect to the compressed headers, however, it must fist synchronize using the full header. An object of the present invention is to present full headers to the decompressor 320 (and the decompressors of other mobile stations receiving the broadcast content) in an efficient manner. This operation will now be described in more detail.

In accordance with the present invention, full-header (sometimes abbreviated herein as "FH") transmission to the mobile station from the PDSN to the mobile station is accomplished with the system in one of at least two operational modes. In "normal mode", the full (that is, uncompressed) header is transmitted periodically but with low frequency. The period between FH transmissions in normal mode may remain constant or vary according to some predetermined algorithm, which could for example take into account historical data related to difficulties or efficiencies encountered in certain areas or under certain conditions. At one extreme, no full-header transmissions take place at all until a mobile-station or system request is received. (This could be, but is not necessarily considered a separate "zero" mode.) At the other, full header-transmissions in normal mode should not exceed a preset maximum, which may be a function of local network capacity, among other factors.

When a full header request is received, the system enters high full-header frequency (HFHF) mode, and full headers are transmitted with greater frequency. As with normal mode, the HFHF-mode transmission period may vary, preferably within a defined range. The system remains in HFHF mode until an indication is received that it should return to normal (or zero) mode. Naturally, the great majority of requests to enter HFHF mode will be received from one or more mobile stations operating in the PDSN coverage area. In this case, each request is noted and the system does not return to normal HF mode until an acknowledgment (ACK) has been received from each requesting mobile station. In one embodiment, the PDSN will not wait indefinitely for an ACK from each mobile station, but will instead return to normal mode after a certain period of time has elapsed. This feature would be especially useful where a request-sending mobile station moves from the PDSN-coverage area, or loses contact with the network entirely, before it can send an ACK message.

An HFHF-mode request may also come from the network, for example where an event in the broadcast might be expected to require more frequent FH transmission. When this occurs, the PDSN could request an ACK from all subscribing mobile stations in the area, and returns to normal-FHF mode only when each such mobile station has responded, or when a certain time period has elapsed (that is, without receiving a further HFHF-mode request). Naturally, where appropriate a range of FH-transmission modes could be established, each with their own trigger mechanism, algorithm for determining the period of FH transmissions, and terminating events.

Figure 4:
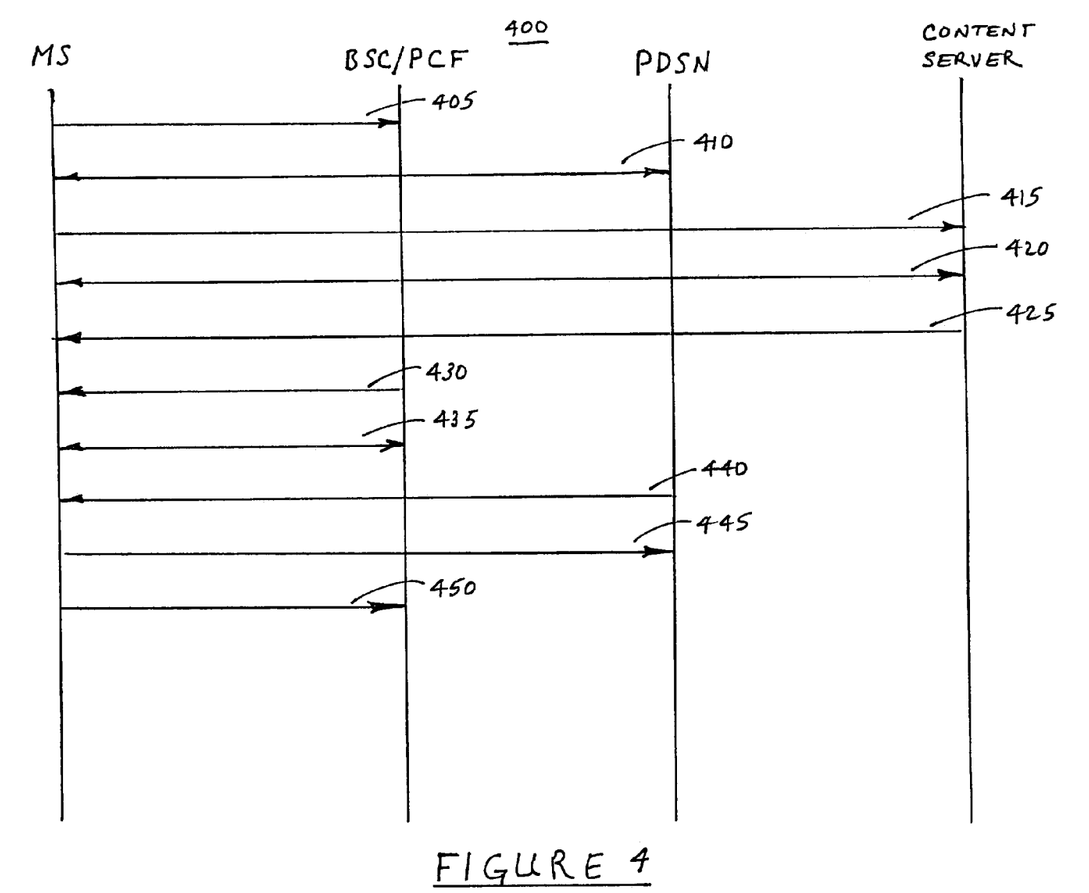
FIG. 4 is a signal flow diagram illustrating the flow of calls for obtaining a full header during initialization according to one embodiment of the present invention.

FIG. 4 is a signal flow diagram 400 illustrating the flow of calls for obtaining a full header during initialization according to one embodiment of the present invention. Note that in FIG. 4 the base station controller (BSC) and the packet control function (PCF) are represented as a single function (BSC/PCF). The call flow begins with the mobile station (MS) is powered up and in an 'idle' state. The origin of the broadcast presentation is a content server, which is likewise presumed to be operational. When the mobile-station subscriber wishes to receive a broadcast-(including multicast-) based service, it transmits a request 405 to originate packet service (service option (SO)33). A point-to-point protocol (PPP) session 410 with a dedicated radio channel setup is then established with the packet-data serving node (PDSN). The mobile station may then subscribe to the broadcast service.

In the illustrated embodiment, the mobile station transmits a high-speed broadcast service (HSBS) request 415 to the content server through the BSC/PCF and PDSN. A security association establishment session 420 ensues, and, when established, the content server returns a HSBS subscription granted (BAK) message 425 to the mobile station. The mobile station decompressor must now be synchronized to be able to read compressed header transmissions. After receiving the BAK message 425, the mobile station receives a broadcast/multicast service parameters message (BSPM) 430 from the BSC/PCF. The mobile station then tunes to a forward broadcast-services channel (FBSCH) and transmits a request 435 for a full-header update. The PDSN then transmits, in response to this request, a multi-channel flow treatment protocol (MCFTP) full header transmission 440. As mentioned above, in one embodiment this may cause the PDSN to shift to HFHF mode.

When the mobile station has received the full header information and been able to synchronize, it sends a MCFTP full header update ACK message 440 to the PDSN, which may then return to normal-(or zero-) FH mode. The mobile station then transmits to the BSC/PCF an SO message 450 indicating that the packet service option may return to a dormant state. Having synchronized its decompressor, the mobile station may then receive and decode broadcast content with compressed headers.

Figure 5:
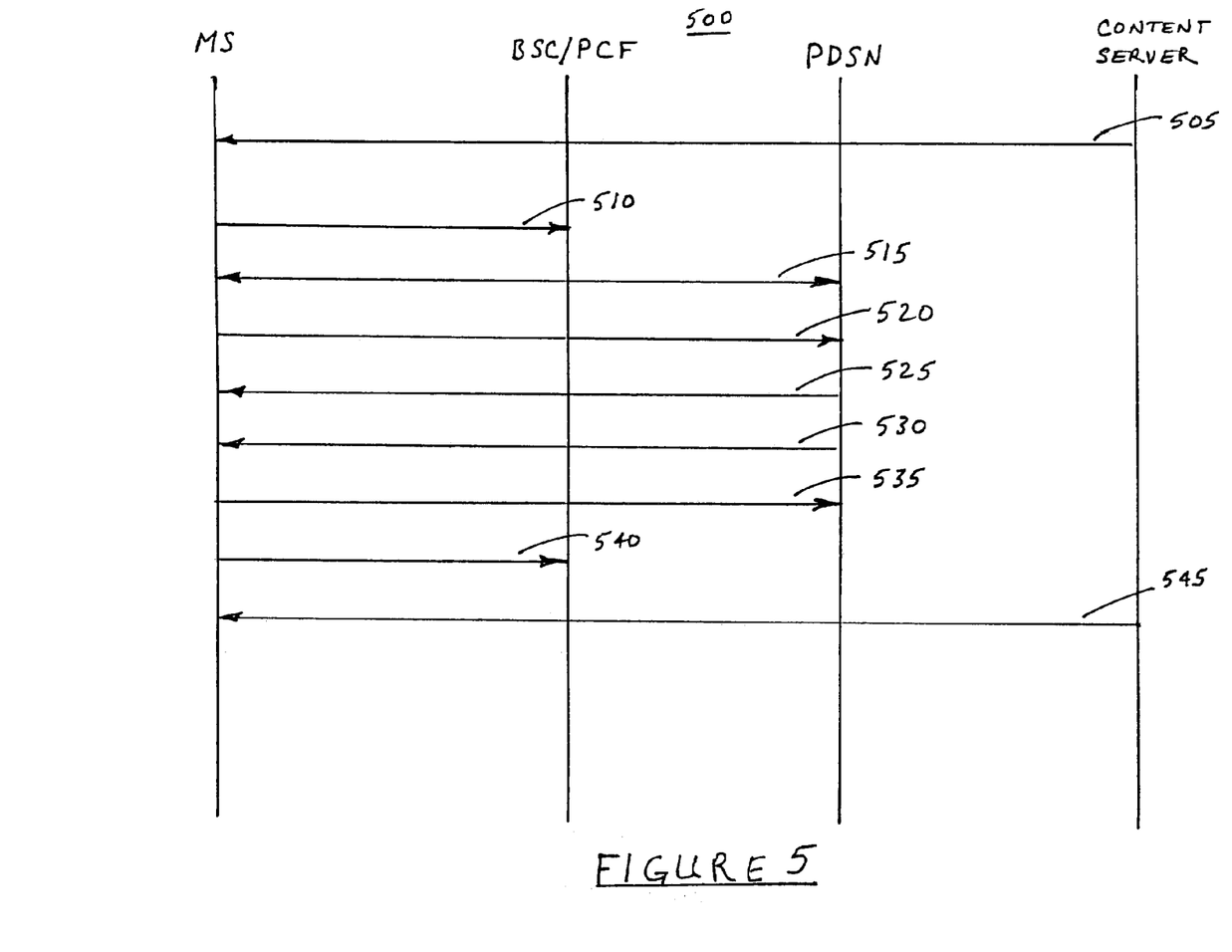
FIG. 5 is a signal flow diagram showing the flow of calls required when a mobile station receiving broadcast information loses synchronization according to one embodiment of the present invention.

FIG. 5 is a signal flow diagram 500 showing the flow of calls required when a mobile station receiving broadcast information loses synchronization according to one embodiment of the present invention. In this case, the broadcast has already been initiated, perhaps as described above, and the broadcast stream 505 is being transmitted from the content server to the mobile station. At some point the mobile station, unable to successfully decompress the broadcast after a given number of attempts, detects an out-of-sync condition. When the mobile station detects the header context is out-of-sync, it transmits a SO 33 reconnect packet 510. A PPP session 515 is then established. The mobile station uses the PPP session 515 to submit an MCFTP full header request 520 to the PDSN. At the same time, the mobile station monitors the broadcast channel for any full header transmission 525 associated with the broadcast, if any, which may have been transmitted pursuant to another request or simply as a normal-FH mode periodic transmission. Upon receiving full header request 520, the PDSN will transmit a full header message 530.

In any case, when the mobile station receives a full header related to the broadcast and is able to synchronize, it again sends an MCFTP full header ACK 535 on PPP. The mobile station then transmits a message indicating that the packet SO may return to a dormant state. Once again, dedicated channels reserved for the PPP session may be released after the PPP session goes dormant. The PDSN moves back to normal operation for low-frequency header refresh cycle, which in one embodiment of the present invention may be the normal FH mode referred to above.

In an alternate embodiment, not shown, the MCFTP full header ACK feature may be disabled in order to save network resources. In this embodiment, the PDSN will simply send a full header update periodically. In this case, of course, a CDMA 2000 parameter would have to be defined for enabling and disabling the ACK feature when either action is desirable. This new parameter might be termed a broadcast service parameter's message.

Figure 6:
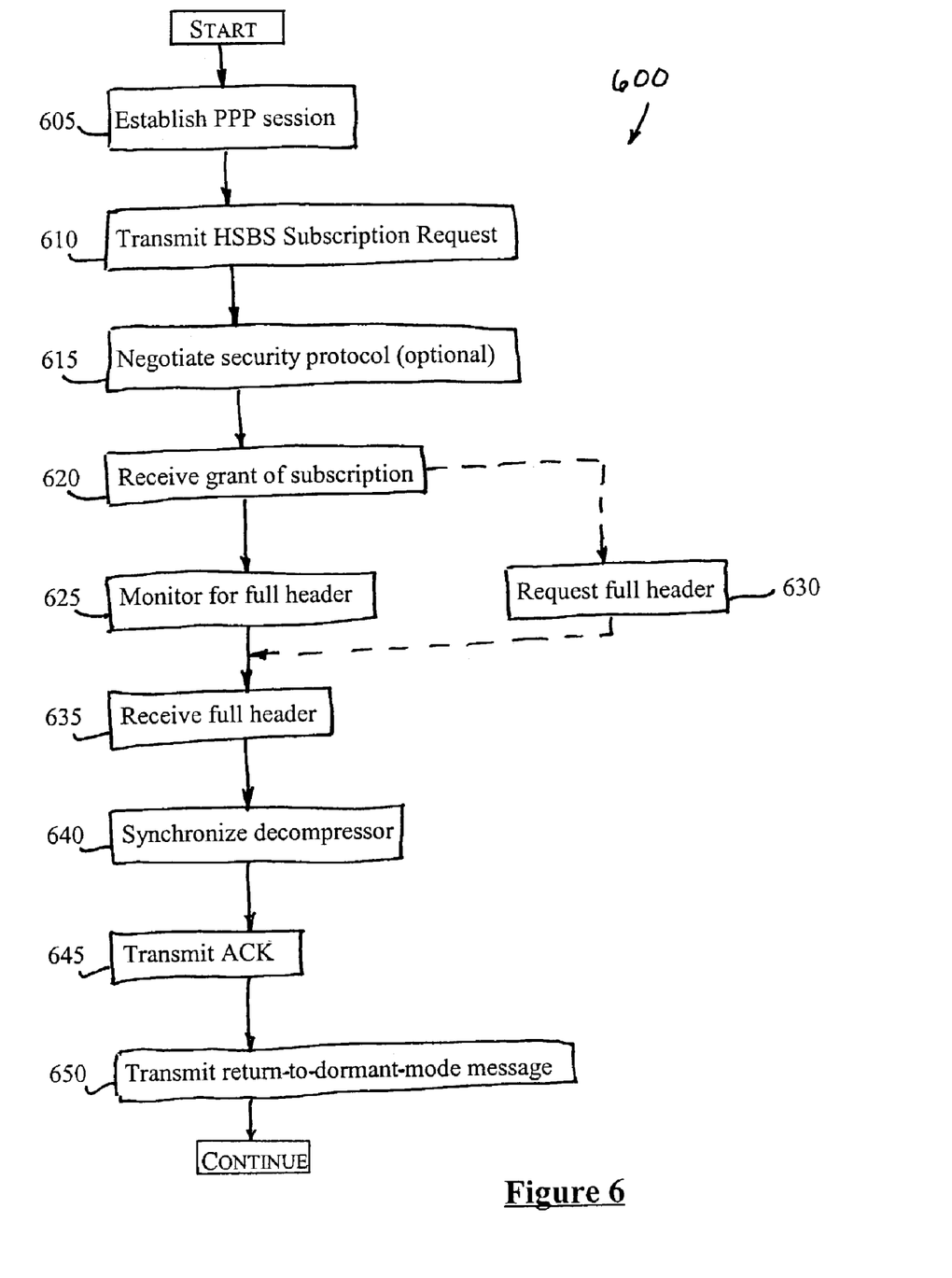
FIG. 6 is a flow diagram illustrating a method of receiving broadcast multimedia content at a mobile station according to an embodiment of the present invention.

FIG. 6 is a flow diagram illustrating a method 600 of receiving broadcast multimedia content at a mobile station according to an embodiment of the present invention. At START it is assumed that the mobile station, such as mobile station 300 shown in FIG. 3 is powered up and has registered in the coverage area of a radio communications network having components operable according to the present invention. The mobile station begins by establishing a PPP session with the PDSN (step 605). When the PPP session is set up, the mobile station transmits a request for broadcast services, such as a HSBS Subscription Request (step 610). If necessary, the mobile station then negotiates security protocols with the broadcasting entity (step 615). If a subscription is available, the mobile station receives a message (BAK) that the subscription has been granted (step 620).

The mobile station then begins monitoring the broadcast channel (step 625) for a full header that it can use to synchronize its header decompressor. It may also transmit a request (step 630) to the PDSN that a full header be sent. These two steps 625 and 630 need not be done in order, and in fact the full header request (step 630) may not be sent until monitoring (step 625) has not been successful for some period of time, or may not be sent at all. In any case, when the full header is received (step 635), the decompressor is synchronized (step 640). Upon successful synchronization, an acknowledgment (ACK) is transmitted (step 645) so that the PDSN is aware that the mobile station no longer requires transmission of the full header (at least for the time being). As mentioned above, the PDSN may switch modes upon receiving a full header request (step not shown), and may return to a normal full-header-transmitting mode when it learns that the requesting mobile has successfully been synchronized. The mobile station then transmits a message so that the PPP session returns to a dormant state (step 650).

In this manner the mobile station, and in fact many mobile stations may receive broadcast content from a content server, substantially maintaining themselves in a state of synchronization with respect to header compression. The network benefits because full headers are sent less often, decreasing capacity demands, and because full headers are sent in a PPP session, no synchronization is required between the full header on the one hand and the compressed header sent over the broadcast channel on the other.

The preceding descriptions are of preferred examples for implementing the invention, in order to make its practice and application clear to one of ordinary skill in the art. The scope of the invention, however, should not necessarily be limited by this description. Rather, the scope of the present invention is defined by the following claims.

What is claimed is:

1. A method for a radio telecommunication system operable according to a standard protocol, said method for synchronizing a mobile station decompressor for performing broadcast-service packet-header decompression, said method comprising the steps of:

establishing a point-to-point protocol (PPP) session between the mobile station and a packet data serving node (PDSN);

transmitting by the mobile station a broadcast service subscription request;
receiving in the mobile station a grant of broadcast service subscription;
transmitting by the mobile station a request for a full header transmission;
monitoring the PPP session for a full header transmission;
receiving a full header transmission formed of a multi-channel flow treatment protocol transmission; and
synchronizing the mobile-station decompressor using the received full header received during said step of receiving the full header transmission.

2. The method according to claim 1, further comprising the step of transmitting an acknowledgment message (ACK) for notifying the PSDN that the mobile station has been synchronized.

3. The method according to claim 2, further comprising the step of transmitting a notification from the mobile station subsequent to sending the ACK message for placing the PPP session into a dormant state.

4. The method according to claim 1, further comprising the step of generating the request for the full header transmission.

5. The method according to claim 1 further comprising the step of negotiating a security protocol subsequent to the step of transmitting a broadcast service subscription request.

6. The method according to claim 1, further comprising the steps of:
receiving a broadcast-content stream; and
decompressing the broadcast-content packet headers in the mobile station.

7. The method according to claim 6, further comprising the step of detecting an out of-sync condition within the mobile-station decompressor.

8. The method according to claim 7, further comprising the steps of:
re-establishing the PPP session;
transmitting a full header update request;
receiving a full header responsive to the full header update request; and
re-synchronizing the decompressor.

9. An apparatus for use in a mobile station for communicating in a radio telecommunication system operable according to a standard protocol to receive broadcast content in compressed packet-data form, said apparatus comprising:
transmit circuitry for transmitting messages related to the broadcast services including a request message for a full header during a PPP session;
receive circuitry for receiving the broadcast content and for receiving messages related to the broadcast services;
a decompressor coupled to the receiver circuitry for decompressing at least compressed header information in the received broadcast content, wherein the decompressor synchronizes based on a full header received in a PPP session the full header formed of a multi-channel flow treatment protocol; and
a controller for controlling the operation of the transmit circuitry, the receive circuitry, and the decompressor.

10. The apparatus according to claim 9, wherein the decompressor further comprises an out-of-sync detector for detecting an out-of-sync condition.

11. The apparatus according to claim 10, wherein the controller is operable to receive an indication of an out-of-sync detected in the decompressor and further operable to direct the transmit circuitry to transmit a full header update request.

12. A method of facilitating the transmission of broadcast content from a broadcast server to at least a first mobile station operating within a radio telecommunication system, said method comprising the steps of:
receiving a request from the first mobile station to establish a PPP session;
establishing a PPP session between the first mobile station and a packet data serving node (PDSN);
relaying a broadcast subscription request from the first mobile station to a content server;
sending a broadcast service request grant from the content server to the first mobile station;
receiving a request from the first mobile station for a full header transmission;
transmitting to the first mobile station a full header formed of a multi-channel flow treatment protocol transmission for synchronizing a decompressor in the mobile station so that it is able to decompress the compressed header information; and
relaying broadcast content from the content server to the first mobile station, wherein the broadcast content transmitted to the mobile station includes packet data with compressed packet headers.

13. The method according to claim 12, wherein the full header is transmitted on a periodic basis to the first mobile station.

14. The method according to claim 13, further comprising the steps of:
increasing the frequency of full-header transmissions in response to reception of the request for the full header transmission; and
decreasing the frequency of full-header transmissions subsequent to sending a plurality of full-header transmissions with increased frequency.

15. The method according to claim 14, further comprising the step, subsequent to the step of transmitting the full header, of receiving an acknowledgement (ACK) message from the first mobile station indicating that it has successfully synchronized its decompressor.

16. The method according to claim 15, wherein the step of decreasing the frequency of full header transmissions is performed in response to receiving the ACK message from the first mobile station.

17. The method according to claim 14, wherein the broadcast content is being relayed to at least a second mobile station operating within the radio telecommunication system, and further comprising the step of receiving a request for full header transmission from the at least second mobile station.

18. The method according to claim 17, wherein the step of decreasing the frequency of full header transmissions is performed only after receiving an ACK message from both the first mobile station and from the at least second mobile station.

19. The method according to claim 14, wherein the of decreasing the frequency of full header transmissions is performed after the expiration of a predetermined period regardless of whether an ACK message has been received from a mobile station.

* * * * *